United States Patent [19]

Chan

[11] Patent Number: 5,031,050
[45] Date of Patent: Jul. 9, 1991

[54] METHOD AND SYSTEM FOR REPRODUCING MONOCHROMATIC AND COLOR IMAGES USING ORDERED DITHER AND ERROR DIFFUSION

[75] Inventor: C. S. Chan, Boise, Id.
[73] Assignee: Hewlett-Packard Company, Palo Alto, Calif.
[21] Appl. No.: 484,713
[22] Filed: Feb. 26, 1990
[51] Int. Cl.$^5$ .................. H04N 1/23; H04N 1/40; H04N 1/46
[52] U.S. Cl. .................. 358/298; 358/457; 358/75
[58] Field of Search .......... 358/75, 298, 456, 457, 358/459, 728; 340/728

[56] References Cited

U.S. PATENT DOCUMENTS

| | | | |
|---|---|---|---|
| 4,339,774 | 7/1982 | Temple | 358/456 |
| 4,651,228 | 3/1987 | Koch | 358/298 |
| 4,654,721 | 3/1987 | Goertzel et al. | 358/459 |
| 4,733,230 | 3/1988 | Kurihara et al. | 340/728 |
| 4,956,638 | 9/1990 | Larky et al. | 358/457 |

OTHER PUBLICATIONS

Fundamentals of Interactive Computer Graphics by Foley and Van Dam, pp. 597-602.
Foley and Van Dam, Fundamentals of Interactive Computer Graphis, 1982, pp. 597-602 (s 17.2.2).
Wood and Steinberg, An Adaptive Algorithm for Spatial Greyscale, Proceedings of the Society of Information Display, vol. 17/2, 1976, pp. 75-77.
B. M. Dawson, Introduction to Image Processing Algorithms, Byte Magazine, Mar. 1987, pp. 169-186.
Dispoto, Mather and Myer, Designer's Guide to Raster Image Printer Algorithms, Hewlett-Packard Company, First Edition, Dec. 1986.

Primary Examiner—William M. Shoop, Jr.
Assistant Examiner—Larry Moskowitz
Attorney, Agent, or Firm—W. J. Bethurum

[57] ABSTRACT

A method and system for color and monochromatic printing wherein ordered dither and error diffusion processes are combined to provide high quality printed images with good spatial resolution, good gray scale transitions, good low frequency and high frequency responses and a high computational speed. Using this process, gray scale numbers representative of a scanned image are summed for each super pixel of the scanned image and divided by a chosen gray level normalizing factor. This division operation is done to obtain a normalized ordered dither quotient number of drops (dots) to be printed in super pixels and to further obtain an error remainder number of dots to be dispersed to surrounding super pixels. The normalized ordered dither quotient number of dots are printed in pre-assigned individual pixels within printed super pixels, and the error remainder number of drops are diffused to other pre-assigned surrounding or adjacent super pixels. In this manner, a combination of ordered dither and error diffusion signal processing and printing is achieved to simultaneously take advantage of some of the best characteristics of both types of signal processing printing. In color printing, the above operation is carried out in each of a plurality of separate color planes, and all of the quotient information is retained and printed in a predetermined priority sequence for each color plane.

25 Claims, 9 Drawing Sheets

3x3 Array Of 4x4 Super Pixels

Pixel Values
From Scanned
Image

| 50 | 250 |
|----|-----|
| 240 | 160 |

Dither Matrix

| 63 | 127 |
|----|-----|
| 254 | 191 |

Printed
Super
Pixel

Pixel Values
From Scanned
Image

| 63 | 191 |
|----|-----|
| 254 | 127 |

Dither Matrix

| 64 | 192 |
|----|-----|
| 255 | 128 |

Empty
Super
Pixel

Pixel Values
From Scanned
Image

| 65 | 193 |
|----|-----|
| 255 | 129 |

Dither Matrix

| 64 | 192 |
|----|-----|
| 254 | 128 |

Full Super Pixel

Combined Overlay Super Pixel

K = 1     C = 3              M = 2     Y = 0

|   |   |   |
|---|---|---|
| 9 | 2 | 6 |
| 5 | 1 | 3 |
| 8 | 4 | 7 |

Dither Matrix

|   |   |   |
|---|---|---|
|   | C | M |
| M | K | C |
|   | C |   |

Output Super Pixel

Fig. 9A            Fig. 9B

|   |   |
|---|---|
| 1 | 2 |
| Void | 3 |

|   |   |
|---|---|
| K | C |
|   | C |

Fig. 10A           Fig. 10B

METHOD AND SYSTEM FOR REPRODUCING MONOCHROMATIC AND COLOR IMAGES USING ORDERED DITHER AND ERROR DIFFUSION

TECHNICAL FIELD

This invention relates generally to monochromatic and color printing and more particularly to an improved method of reproducing color images using a novel process combination of ordered dithering and error diffusion in a parallel signal processing arrangement. This invention serves to improve the print quality of the reproduced color images, and it is operational at relatively high computational speeds.

BACKGROUND ART

Traditionally, digital color images have been converted to a hardcopy output from a color printer using either an ordered dither process or an error diffusion process. Both of these processes are generally well-known in the color image reproduction arts and have been described in many prior art references including, for example, U.S. Pat. No. 4,733,230 issued to Kurihara et al, U.S. Pat. No. 4,651,228 issued to Koch and U.S. Pat. No. 4,339,774 issued to Temple, all incorporated herein by reference. More recently, error diffusion techniques have been used in combination with gray scale assignment methods to achieve high resolution and high print quality color printed images in the field of color ink jet printing. One such process is described, for example, in my now allowed co-pending application Ser. No. 278,881 filed Dec. 2, 1988 and this process is entitled "Method and System for Enhancing the Quality of Both Color and Black and White Images Produced by Color Ink Jet Printers". This application is assigned to the present assignee and is also incorporated herein by reference.

In the ordered dither method of image reproduction, the decision to print or not to print a pixel at a given pixel location (x, y) within an intensity I(x, y) depends upon the value of the dithered matrix at a given location, D(x, y), where D(x, y ) is typically an "n" by "m" matrix. These matrix valves are preassigned in a given pixel sequence along both the x and y directions of a super pixel or reference matrix or "tile", and this super pixel or reference matrix consists of a chosen number of individual pixels. If the value of I(x, y) is greater than D(x, y) at any given individual pixel location on the super pixel reference matrix, then the pixel at location x, y is printed, otherwise it is not printed.

The main advantage of this conventional approach to ordered dithering is its simplicity, since it involves only repetitive threshold comparison on a pixel by pixel basis. Different methods of selecting the dither matrix D will lead to different output characteristics, and the selection of matrix size (n by m) will also influence the output print quality. This ordered dither method of image reproduction exhibits excellent computational speed and is capable of either a good gray scale resolution or a good spatial resolution, but not both. A large ordered dither matrix D will result in good gray scale reproduction but poor spatial resolution, whereas a small ordered dither matrix D will result in good spatial resolution and a poor gray scale reproduction.

Extending these conventional ordered dither approaches to color image processing, there are as many ordered dither matrix masks as there are numbers of color planes. Regardless of how many different masks are used, there will always be a situation where a given pixel must be turned on for more than one color plane. While this situation is acceptable for some printing processes, it may not always be acceptable for other printing processes such as ink jet printing where different colors of ink, when piled on top of one another, will result in poor color mixing or undesirable color bleed. In electrophotographic processes which do not use transparent toners, different colors of toners piled on top of one another will also result in poor picture quality. In order to resolve the above conflicts with both ink jet and electrophotographic printing, a large number of computational processes are required.

Ordered dither processes of the above type are further described in a textbook entitled *Fundamentals of Interactive Computer Graphics* by Foley and Van Dam, Addision-Wesley Publishing Company, Copyright 1982, incorporated herein by reference. See particularly Section 17.2.2 and pages 597–602 of this reference.

Error diffusion is a technique used to distribute the remainder information to the neighboring pixels surrounding a primary printed pixel. This remainder information represents the error between a printable gray scale number and the complete input image gray scale data truly representative of a scanned image. This error diffusion process is frequently carried out using a selected one of several well-known algorithms which are described in my above identified copending application Ser. No. 278,881 and also in an article by Floyd and Steinberg entitled "An Adaptive Algorithm For Spatial Gray Scale", *Proceedings of the Society of Information Display*, Vol. 17/2, 1976, incorporated herein by reference.

Color and monochromatic printing methods which employ only ordered dither processing or only error diffusion processing alone have been characterized by several distinct disadvantages. Whereas ordered dither processes are very fast in computational speed, a significant amount of gray scale information can be lost due to the above described thresholding technique. These ordered dither processes have also been characterized by excessive noise, poor spatial resolution, and poor low and high frequency responses. In addition, when using multiple color planes and when restricted to dot-next-to-dot (DND) formatting, the traditional method of ordered dither is difficult to implement and is inefficient in resolving the DND formatting requirement.

On the other hand, printing methods which use only error diffusion to the exclusion of ordered dither techniques are relatively slow in computational speed (e.g. ⅛ of the ordered dither computational speed) and will render an image with an objectionable artifact known in the color printing art as "worms". This artifact is caused by allowing the error number generated in the error diffusion process to accumulate during printing and by the failure to adequately distribute the error remainder drop counts to pixels surrounding the just printed pixel or super pixel.

SUMMARY OF THE INVENTION

The general purpose of the present invention is to provide a new and improved method and system for color and monochromatic printing which combines most of the advantages of both the ordered dither and error diffusion processes in such a manner as to provide the good detail and color rendering of error diffusion signal processing without the artifact of "worms". Furthermore, this system and method will simultaneously have the speed of an ordered dither process and with a much improved low frequency and high frequency response with respect to an ordered dither process alone. In addition, the present system and method will easily resolve the formatting restriction of dot-next-to-dot (DND) printing as well as operate satisfactorily if restricted by a maximum ink volume per unit area ($V_{max}$) of a printed media requirement to prevent or minimize paper cockleing. Thus, the present invention is useful in the reproduction of printed images having good "worm free" spatial resolution, good gray scale transitions, and a high computational speed.

In accordance with the present invention, there is provided a method and system for converting scanned color image information to hardcopy output and includes initially scanning a color image to generate information containing cyan, (C), magenta, (M), yellow, (Y), and black, (K) super pixel information for further processing. This information is added in separate color planes to obtain $C_{sum}$, $M_{sum}$, $Y_{sum}$, and $K_{sum}$ information representative of the added super pixel information in each color plane. This information is then divided in each color plane to thereby obtain a quotient signal and a remainder signal in each color plane and identified as $C_Q$, $C_R$; $M_Q$, $M_R$; $Y_Q$, $Y_R$; $K_Q$, $K_R$ in each color plane. The remainder signal in each color plane is distributed through a closed loop error distribution system and recombined with the originally added pixel information in each color plane identified above. The quotient information resulting from the above division in each color plane is distributed in an ordered dither process to an ordered dither output matrix from which a printed color image may be derived.

Using this process and associated system, a combination of ordered dither and error diffusion signal processing and printing may be achieved to simultaneously derive a number of advantages from each process. As an example, if an ordered dither process requires a computational time of "X" and error diffusion process requires a computational time of 8X, the present invention will require a computational time of typically around 1.2X–1.3X.

In a preferred embodiment of the invention, each super pixel within a larger super pixel matrix (I, J) comprises m x n individual pixels, and the chosen gray level normalizing factor is equal to $2^8$ for an eight bit data representation. Since this normalizing factor has a base value of 2, this method and signal processing system possesses an exceptional computational speed. In contrast to known prior error diffusion techniques, the error remainder number of drops in the present process is diffused into assigned super pixels adjacent to the primary or just-printed super pixel. This minimizes the possibility for an undesirable accumulation of error data, and there is less computational effort involved in such super pixel error diffusion in comparison to single pixel error diffusion.

In accordance with the preferred embodiment described below, a single data processing methodology or code may be used to handle both the ordered dithering process and the error diffusion process. This novel feature in turn simplifies the construction and cost of implementing the system and method for carrying out this invention.

Accordingly, an object of this invention is to provide a new and improved method and system in the type described which combines many of the best performance characteristics of error diffusion with many of the best performance characteristics of ordered dither processing in a hybrid image conversion process. This process is useful to improve the overall print quality and resolution of color images reproduced on a hardcopy output.

Another object is to provide a new and improved method and system of the type described which eliminates the artifact of "worms" frequently characteristic of error diffusion image conversion processing.

Another object to provide a new and improved method and system of the type described which is operative at relatively high computational speeds.

Another object to provide a new and improved method and system of the type described which produces hardcopy output images having good spatial resolution, a reasonably good gray resolution, and good low frequency and high frequency response characteristics.

Another object is to provide a new and improved method and system of the type described which is compatible with both dot-on-dot (DOD) and dot-next-to-dot (DND) formatting.

A novel feature of this invention is the provision of a system and method for use in both monochromatic and color printing which simultaneously employs ordered dithering and error diffusion in a parallel signal processing scheme useful to retain a maximum amount of information in a hardcopy replication of a scanned image. Ordered dither quotient information is printed in a series of predetermined super pixel reference matrices to produce a hardcopy output, and remainder information associated with this quotient information is dispersed in a closed loop feedback process and system and recombined with incoming image information. This is done in a manner designed to minimize the loss of information during reproduction of a scanned image as hardcopy output from the system.

Another feature of this invention is the provision of a method and system of the type described which is operative to generate ordered dither quotient and remainder data representative of a scanned image. The system is also operative to print the quotient data information in a predetermined priority sequence of individual pixel locations within a larger or super pixel reference matrix or mask.

Another feature of this invention is the provision of a method and system of the type described which is operative for generating quotient and remainder information for each of a plurality of color planes, such as the cyan (C), yellow (Y), magenta (M), and black (K) color planes. Then, quotient data for each color plane is printed in a super pixel reference matrix or mask using this approach, and dot-on-dot (DOD) printing is never forced as in the prior art case where a super pixel reference matrix or mask is used for each color plane. Additionally, voids may be retained in a printed super pixel in order to eliminate or reduce color bleed as in the case of ink jet printing. This was not possible in prior art ordered dither methods which required a separate super pixel reference matrix (also referred to as a tile or mask) for each color plane.

Another feature of this invention is the provision of a method and system of the type described which possesses novelty in the ordered dither operation per se and apart from its combinational novelty with error diffusion processes. In this novel ordered dither approach, ordered dither quotient information is preassigned to individual pixels within a larger super pixel reference matrix. All of this quotient information is used in generating hardcopy output and is not compared as in conventional ordered dither processes in a piece-wise fashion using reference matrix or mask thresholding techniques where substantial amounts of image information are lost.

Another feature of this invention is a provision of a novel error diffusion process per se which is operative to disperse error remainder information into a plurality of super pixels surrounding a just printed super pixel from which error remainder information is extracted. This technique stands in significant contrast to conventional error diffusion processes where only individual pixels receive error distribution data from a just printed pixel or super pixel.

Another feature of this invention is the provision of a novel parallel signal processing system which is operative in a unique, cooperative and elegantly simple manner to provide image conversion utilizing a common algorithm suitable for handling both the error diffusion and ordered dither processes as described further herein.

Another feature of this invention is the provision of an improved process and system of the type described which is capable of limiting the printed drop or dot volume to a predetermined maximum print volume, $V_{max}$, such as may be required in ink jet printing applications. This technique has been used to prevent paper cockleing in ink jet printing applications and to limit the amount of toner introduced onto a given print media in electrophotographic printing applications.

Another feature of this invention is the provision of a signal processing system of the type described which is uniquely adapted and suitable for use and operation with an output ordered dither matrix using either cluster or disperse pixel assignment methods. These methods are capable of handling all cases of dot-next-to-dot (DND) and dot-on-dot (DOD) formatting, including pixel voids, in a unified manner.

The above objects, advantages and novel features of this invention will become better understood from the following description of the accompanying drawings.

BRIEF DESCRIPTION OF THE DRAWINGS

FIGS. 9A and 9B illustrate another type of DND ordered dither matrix and DND pixel assignment process according to the present invention for printing in multiple color planes.

FIGS. 10A and 10B illustrate another type of DND ordered dither method of printing in accordance with the present invention which is useful for leaving voids in a printed pixel matrix.

DESCRIPTION OF THE PREFERRED EMBODIMENT

Figure 1:
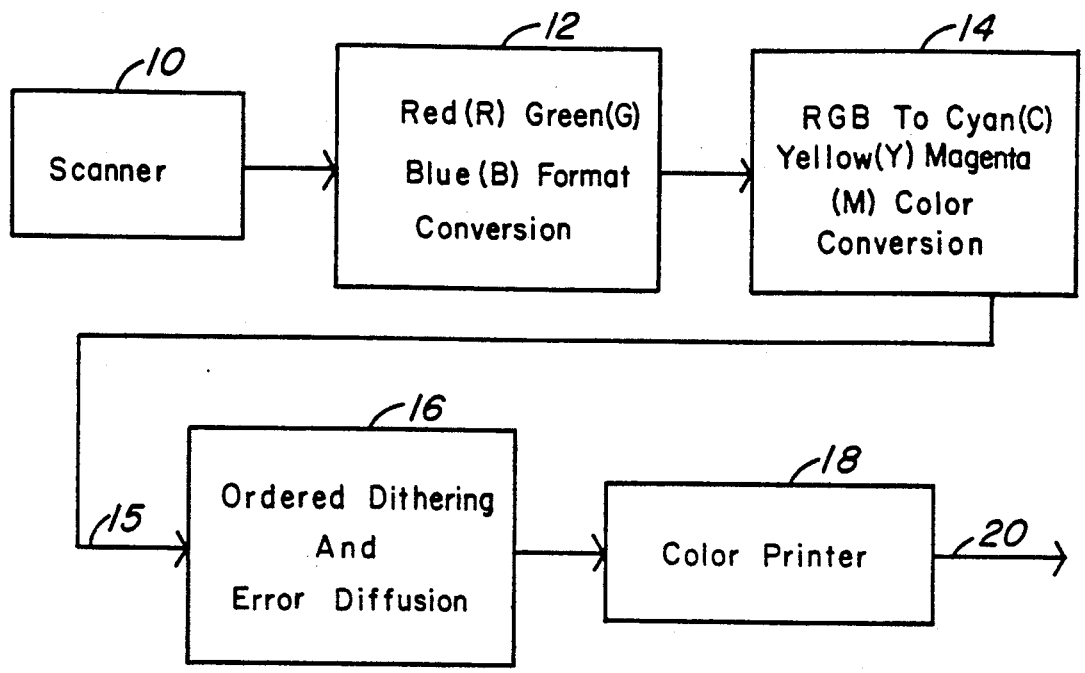
FIG. 1 is a functional block diagram of an image conversion system which may employ the new and useful system and method according to this invention.

Referring now to FIG. 1, a scanner 10 may be used to convert a color image into digital gray scale data for application to an additive red-green-blue (R-G-B) format conversion stage 12. The R-G-B output data from the format conversion stage 12 is applied as indicated to the subtractive color primaries stage 14, also known as the cyan-yellow-magenta (C-Y-M) color conversion stage 14 in a well-known manner and may include up to 100% undercolor removal to obtain black, as is also well-known. A chromatic color (black) cannot be easily made by mixing Y-M-C ink colors, and such mixing will also increase the amount of ink consumed as well as fail to obtain a pure black color. Therefore, the black ink created by YMC colors is preferably replaced by pure black (K), and this replacement and the generation of pure black is known in the art as undercolor correction or undercolor removal (UCR). Thus, the use of 100% undercolor removal is for the purpose of both minimizing ink consumption and improving resolution of the image reproduced on hardcopy output.

The output of the C-Y-M color conversion stage 14 is a digital data stream which is applied to the hybrid error diffusion (ED) and ordered dither (OD) stage 16, and the hybrid ED/OD stage 16 in turn drives a color printer 18, such as, for example, a thermal ink jet color printer. With the exception of the hybrid ED/OD stage 16, the general functional arrangement of the image scanning and reproduction system of FIG. 1 is generally well known in the image processing arts. One type of image processing operation of such a system is described, for example, in the March 1987 issue of *BYTE Magazine* in an article by B. M. Dawson entitled "Introduction To Image Processing Algorithms" at page 169 et seq. Such image processing capability and corresponding system operation is also described in a publication by Gary Dispoto et al entitled *Designer's Guide to Raster Image Printer Algorithms*, First Edition, December 1986, Copyrighted by the assignee Hewlett-Packard Company in Palo Alto, Calif. Both of these latter references are incorporated herein by reference.

Figure 2:
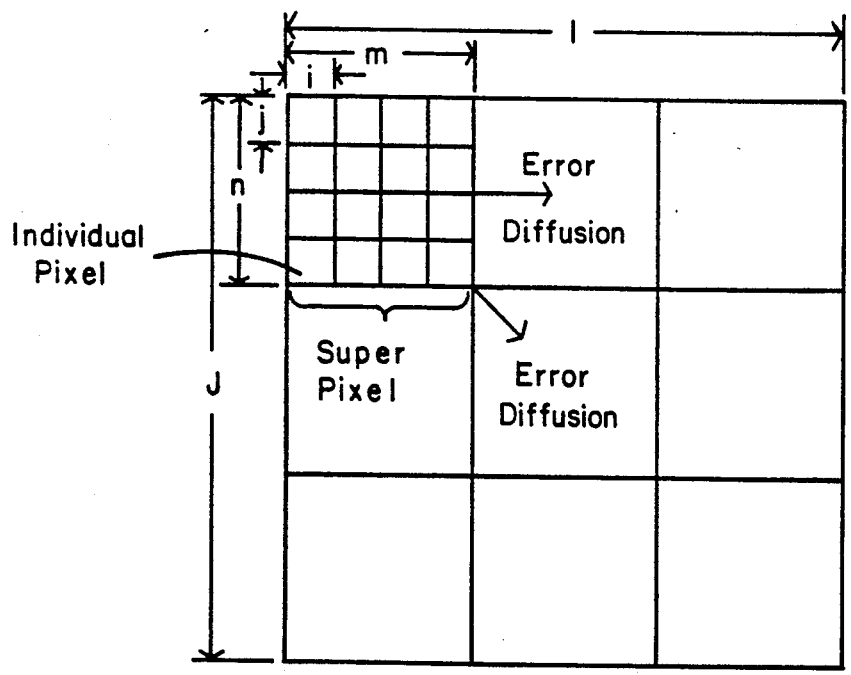
FIG. 2 illustrates an I, J array or index of scanned super pixels, with each super pixel having its own i-j index of individual pixel information to be processed in accordance with the present invention.

Referring now to FIG. 2, there is shown a large matrix of super pixels identified by the I, J indices and consisting of individual super pixels identified by the m-n indices. Each of the m-n super pixels contains sixteen individual i-j pixels. This figure provides the x-y matrix information which is used in some of the mathematical notation of the present specification, and the m-n super pixel in FIG. 2 is a typical 4 by 4 or sixteen segment super pixel. In practicing the present invention, it has been found that 6 by 3 or 8 by 4 super pixels provide a good compromise or tradeoff between good computational efficiency on the one hand and good output picture quality on the other.

Figure 3A:
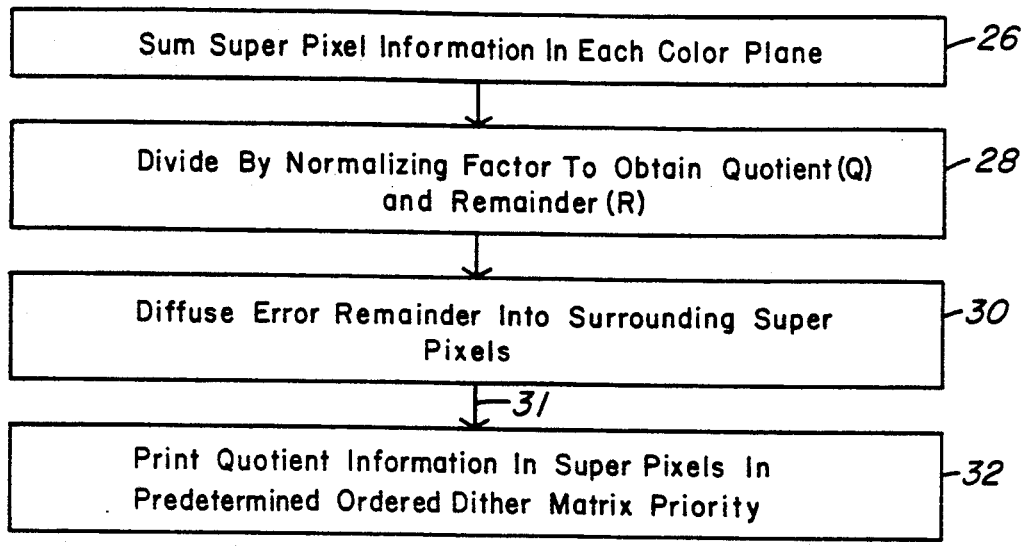
FIG. 3A is a schematic and descriptive flow chart depicting the data processing methodology and sequence of steps used for controlling the operations of error diffusion, ordered dither and pixel assignment according to the present invention.

Referring now to FIG. 3A, there is shown a method of processing one super pixel in accordance with the invention. At the initial step in FIG. 3A, the added drop count numbers for each of the C, M, Y, and K super pixel values ($C_{sum}$, $M_{sum}$, $Y_{sum}$, and $K_{sum}$) are totalled and then processed to a division step or stage 28. In the notation of FIG. 2 above, these sums for each color plane are given as follows:

For each Super Pixel [$I, J$]

$$K_{sum} = \sum_{i=0}^{n} \sum_{j=0}^{m} K_{ij} + K_r [I, J]$$

$$C_{sum} = \sum_{i=0}^{n} \sum_{j=0}^{m} C_{ij} + C_r [I, J]$$

$$M_{sum} = \sum_{i=0}^{n} \sum_{j=0}^{m} M_{ij} + M_r [I, J]$$

$$Y_{sum} = \sum_{i=0}^{n} \sum_{j=0}^{m} Y_{ij} + Y_r [I, J]$$

Where $K_{ij}$, $C_{ij}$, $M_{ij}$, and $Y_{ij}$ are the pixel values of black, cyan, magenta, and yellow, respectively, and $K_r$, $C_r$, $M_r$, and $Y_r$ are the previous super pixel residual values of black, cyan, magenta, and yellow, respectively.

The primary color pixel sums above are divided in step 28 by a normalizing factor of $2^8$, and this is done in order to obtain a normalized quotient for each primary color summed and also to obtain an error residual for error diffusion as indicated in step 30 for an 8-bit data representation. In step 30, the error residuals are combined with the previously summed information (as further indicated below in FIG. 3C), and the quotient output from step 28 is processed in parallel with the error diffusion in step 30 to an output super pixel selection and color printing step 32.

Figure 3B:
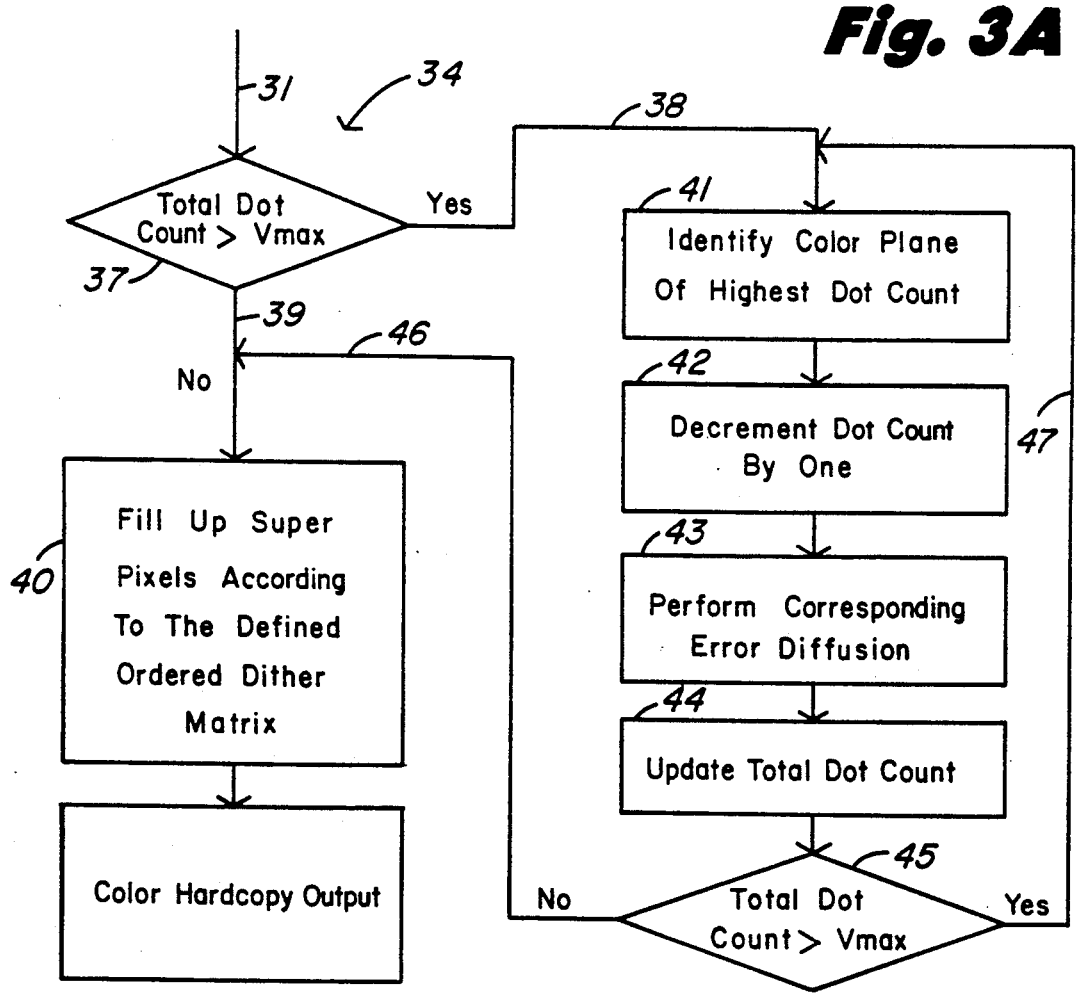
FIG. 3B is a descriptive flow chart depicting the data processing methodology used in imposing a maximum drop or dot count limit on each of the printed color planes.

The output step or stage 32 contains therein an adjustment control stage 34 which is shown in the functional block diagram of FIG. 3B. The function of the adjustment control stage 34 is to count the total number of C, M, Y, and K dots in each color plane and compare this total number with a predetermined maximum allowed number or volume of drops, defined as a maximum volume $V_{max}$. However, $V_{max}$ is not intended to refer only to a maximum volume, but rather to any upper limit on a dot count. If $V_{max}$ is exceeded, then the next highest allowable and available number of drop or dot counts for the C, M, Y, and K sums in each color plane is provided, and the difference between the latter two totals provides a basis for an error diffusion into super pixels surrounding a primary or just-printed pixel as described further below. When the total drop count sum for C, M, Y, and K is finally selected to be equal to or less than $V_{max}$ (or the dot count maximum number), the output signal of the adjustment control stage 34 performs an output ordered dither operation in accordance with the novel pixel assignment process described and claimed herein.

The adjustment control stage 34 includes therein a total dot count stage 37 which is operative to compare an incoming dot count signal with a preassigned maximum dot count number $V_{max}$ and to generate a "yes" or "no" output signal on one of its two output lines 38 and 39 as indicated. If the total dot count does not exceed $V_{max}$, a signal is produced at the input to the pixel assignment and ordered dither matrix stage 40 for providing the ordered dither printing and super pixel matrix assignment used in the production of a color hardcopy output. If, however, the total dot count in stage 37 exceeds $V_{max}$, a signal is generated on line 38 at the input of stage 41 where the color plane of the highest dot count is identified, and a corresponding output signal is then generated and applied to the input of the next stage 42 where the dot count of the previously read color plane is decremented by one.

The output signal from stage 42 is utilized to drive an error diffusion stage 43 which distributes the decremented error signal to super pixels adjacent to the just mentioned super pixel. The error diffusion stage 43 then generates an input signal to the input of the next dot count update stage 44 which is operative to update the total dot count and again provide an output signal at the input of another or second dot count comparison stage 45. The comparison stage 45 then compares the new updated dot count with $V_{max}$ and generates an output "no" signal on line 46 and applied at the input of the ordered dither matrix stage 40 if $V_{max}$ is not now exceeded. If $V_{max}$ is still exceeded, the comparison stage 45 generates an output "yes" signal by way of feedback line 47 which is applied to the input of the color plane identification stage 41. This stage 41 again identifies the color plane of the next highest dot count to start the $V_{max}$ comparison process all over again until a "no" output signal on line 46 is ultimately generated as described above.

Figure 3C:
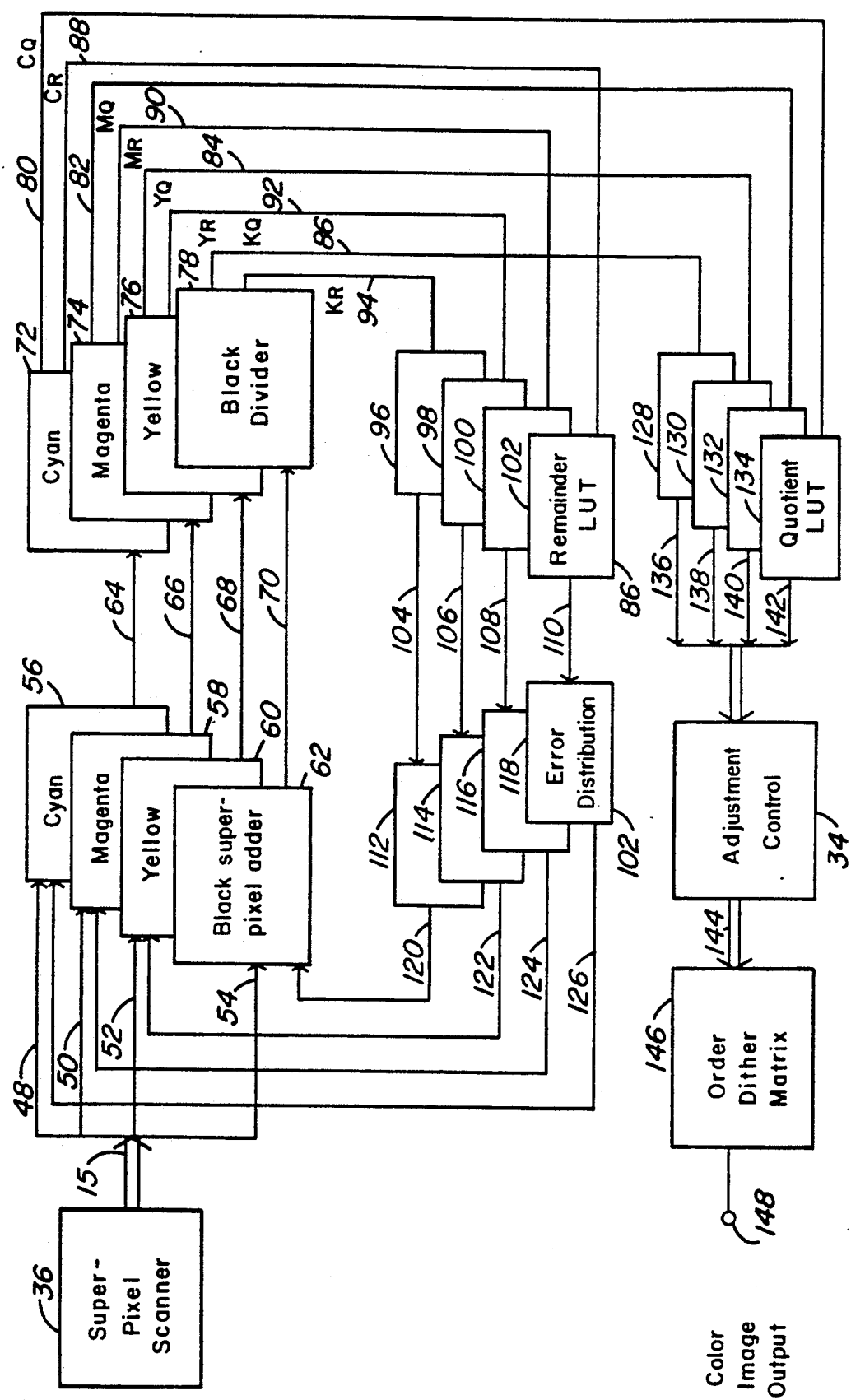
FIG. 3C is a functional electrical block diagram which illustrates in more detail the signal process sequence described in FIG. 3B.

Referring now to FIG. 3C, the super pixel scanner 36 contains stages 10, 12, and 14 of FIG. 1 above, and thus the data line 15 in FIG. 3B corresponds to the data line 15 in FIG. 1. This data line 15 is connected as shown to drive the error diffusion and ordered dither stage 16 which is illustrated in functional block diagram form in FIG. 3B. The data line 15 provides four available data inputs 48, 50, 52, and 54 to the respective cyan, magenta, yellow, and black pixel adders 56, 58, 60, and 62 in the four color planes shown. The above four primary colors of the total pixel information in all of the scanned super pixels in FIG. 2 above are generated respectively on the output data lines 64, 66, 68, and 70. These lines are connected as shown to drive the four divider stages 72, 74, 76, and 78 in the cyan, magenta, yellow, and black parallel processed color planes. The cyan, magenta, yellow, and black pixel information dividers 72, 74, 76, and 78 each have a respective quotient output data line 80, 82, 84, and 86 for receiving the $C_Q$, $M_Q$, $Y_Q$, $K_Q$ quotient data. Additionally, these divider stages 72, 74, 76, and 78 have output remainder data lines 88, 90, 92, and 94 which receive the remainder signals $C_R$, $M_R$, $Y_R$, $K_R$. These latter signals are fed, respectively, into a feedback loop containing black, yellow, magenta, and cyan remainder lookup tables (LUTs) 96, 98, 100, and 102. Each of these lookup tables 96, 98, 100, 102 is used to provide the gray scale information necessary to generate remainder error diffusion signals on the output data lines 104, 106, 108, and 110 respectively. These signals are then applied to the error distribution stages 112, 114, 116, and 118 for the four, black, yellow, magenta, and cyan color planes in the error diffusion feedback loop shown. These error distribution stages 112, 114, 116, and 118 have their output data lines 120, 122, 124, and 126 connected as shown to recombine the error distribution signals on these data lines 120, 122, 124, 126 with the summed information in the four color pixel adder stages 56, 58, 60, and 62, respectively.

The quotient output data lines 80, 82, 84, and 86 leading from the cyan, magenta, yellow, and black divider stages 72, 74, 76, and 78 respectively are connected as shown to a plurality of quotient lookup tables 128, 130, 132, and 134 for each of the black, yellow, magenta, and cyan color planes as indicated. Each of the quotient lookup tables 128, 130, 132, and 134 has an output data line 136, 138, 140, and 142 connected as shown to the adjustment control stage 34 described above in FIG. 3A. The adjustment control stage 34 is utilized as previously described to decrement the drop count output signal totalled from lines 136, 138, 140, and 142 to a value equal to or less than $V_{max}$ in order to provide an acceptable maximum drop count number (signal) on the output data line 144 from the adjustment control stage 34. This signal is used to drive the output ordered dither matrix stage 146 from which a color image output signal is derived from the output terminal 148.

In accordance with the broad teachings of the present invention, the ordered dither matrix stage 146 may utilize any suitable ordered dither process which is compatable with error diffusion processes of the type described herein. Since the broad combination of ordered dither and error diffusion is novel in both the method and system claim formats as presented herein, it is to be understood that the present invention includes within its scope any combination of ordered dither and error diffusion within the scope of the appended claims. However, it should also be understood and appreciated that one specie of the present invention is a new and improved ordered dither method per se which in many of its aspects is believed far superior to any known conventional ordered dither techniques.

In order to demonstrate such superiority of the ordered dither process of the present invention, reference will first be made to FIGS. 4A–4C, 5A–5C, 6A–6C, and 7A–7B in order to demonstrate how image information is undesirably lost when using conventional thresholding type of ordered dither methods. For this demonstration, these three figures show a monochromatic case or example, but the superiority of the present ordered dither process is equally applicable to color printing. Then, after this discussion of conventional ordered dither methods, reference will then be made to FIGS. 8A–8B through FIGS. 10A–10B which serve to illustrate the preferred and novel ordered dither matrix selection method in accordance with the present invention.

Figures 4A, 4B, 4C:
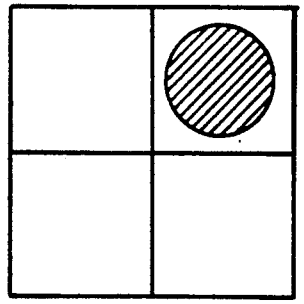
FIGS. 4A, 4B, and 4C illustrate a pixel thresholding process used in conventional prior art ordered dither methods of printing.

Referring now to FIGS. 4A, 4B, and 4C, FIG. 4A is a two by two four quadrant super pixel with each quadrant thereof having an assigned intensity level from the scanned image. In FIG. 4B there is shown a dither matrix or reference tile or mask with each quadrant therein having a preassigned threshold number. The image super pixel in FIG. 4A is simply laid over the reference mask or tile in FIG. 4B and only the upper right hand quadrant in the super pixel of FIG. 4C is printed. That is, only the pixel intensity level in the upper right hand quadrant in FIG. 4A exceeds the upper right hand quadrant in the reference tile of FIG. 4B. Thus, the actual information in FIG. 4A is 400/1024, but the printed information in FIG. 4C is 255/1024. Thus, the loss of information in the thresholding ordered dither process illustrated in figure is equal to 145/1024.

Figures 5A, 5B, 5C:
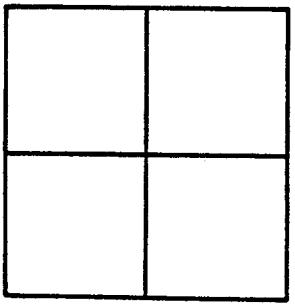
FIGS. 5A, 5B and 5C illustrate an extreme case of pixel assignment in conventional ordered dither printing where a maximum amount of information is lost due to under-printing in the printing process.
Figures 6A, 6B, 6C:
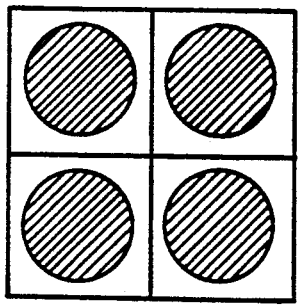
FIGS. 6A, 6B, and 6C illustrate a pixel assignment process using conventional ordered dither printing where a maximum amount of information is lost through over-printing rather than under-printing.

Referring now to FIGS. 5A, 5B, and 5C, this process illustrates the case where a maximum amount of information is lost during thresholding, resulting in an empty or underprinted pixel as shown in FIG. 5C with too little information. This thresholding process may then be compared to the maximum loss of information in an over-printing case in FIG. 6A through 6C where all of the four quadrants in FIG. 6C are printed with "too much information". Again, this is the result of the imprecise nature of the conventional ordered dither threshold process.

Figure 7A:
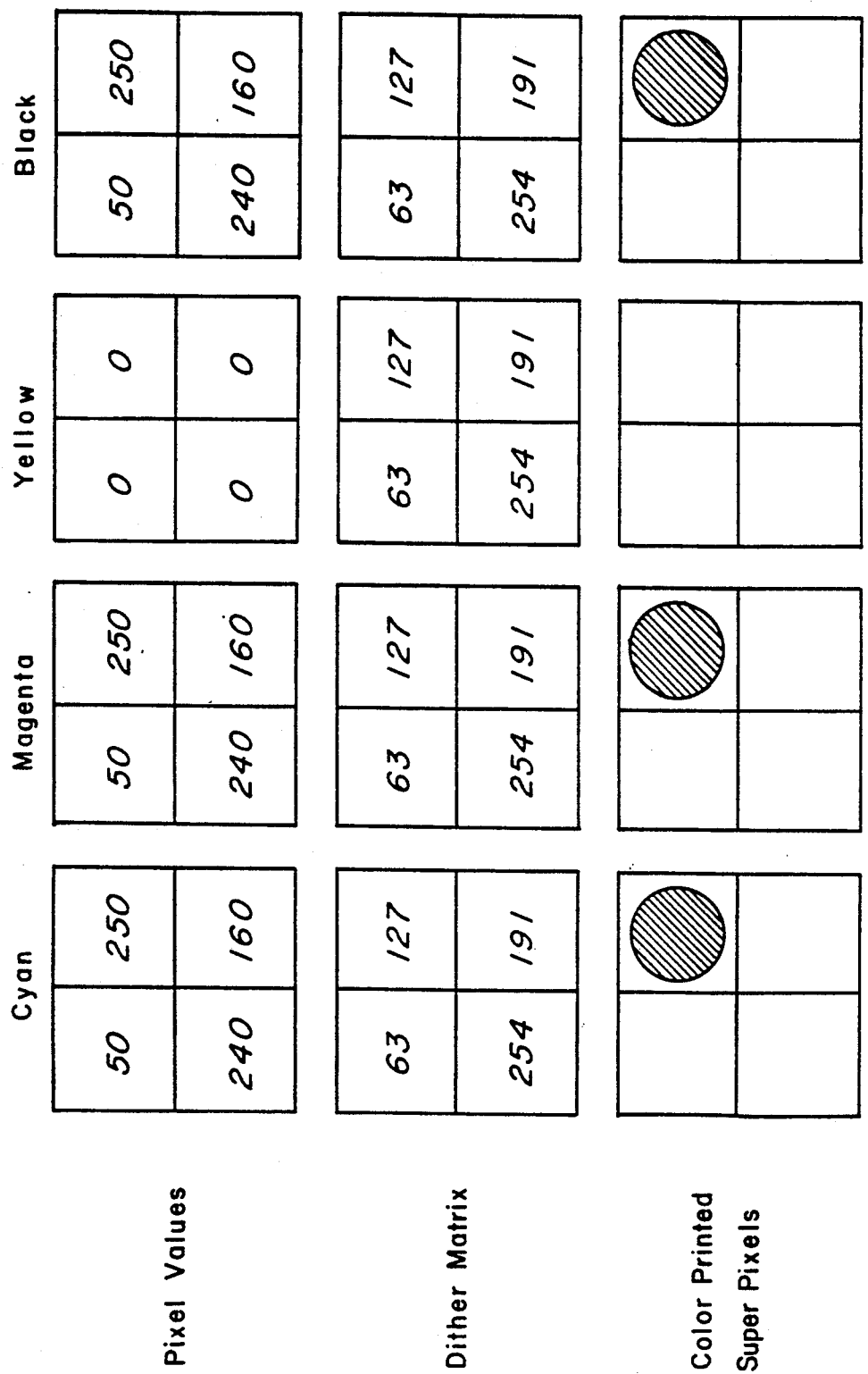
FIGS. 7A and 7B illustrate a pixel assignment process using conventional ordered dither printing for multiple color planes.
Figure 7B:
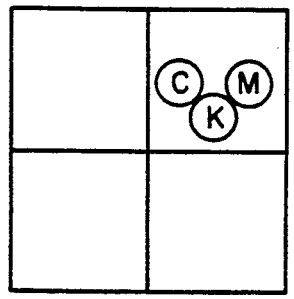

Referring now to FIGS. 7A and 7B, it is believed that an explanation and understanding of these two figures illustrating a conventional ordered dither process will be most useful in an understanding and appreciation of the significant advantages of the present invention. FIGS. 7A and 7B illustrate a scenario of thresholding during color printing in the four color planes of cyan, magenta, yellow, and black wherein the thresholding not only causes a significant information loss in the color planes, but also produces a combined output geometry of the most undesirable print pixel assignment for a 2 by 2 super pixel.

The top row in FIG. 7A shows the actual pixel values for a scanned color image for the four 2 by 2 super pixels in the four C, M, Y, and K color planes. The second row in FIG. 7A shows the reference pixel values for the reference dither matrix or tile to which the pixels in the first row are compared to generate only the output information indicated in the third row of FIG. 7A. This output information is generated only in the upper right hand quadrants of the third row where the actual received pixel value exceeds the dither matrix values.

The result of the combined output for FIG. 7A is to print C, M, and K color dots all in the upper right hand quadrant of FIG. 7B, and even the layman can easily see that, in addition to the loss of information produced by the thresholding process of FIG. 7A, this loss of information is combined with the poorest selection of quadrant printing in FIG. 7B to further degrade the print quality of the reproduced output image.

In contrast to the thresholding and pixel overlay printing process of FIGS. 7A and 7B above, the following example is given to better illustrate the quotient and residual signal processing according to the present invention wherein not only all of the quotient information is retained in printing an output pixel, but this feature is combined with an optimum pixel assignment priority selection sequence. This is done in printing the output matrix so as to simultaneously maximize print quality with no loss of quotient information. As previously indicated, the error diffusion processes used for distributing the error residuals are well-known in the art and are therefor not described in detail herein.

Figure 8A:
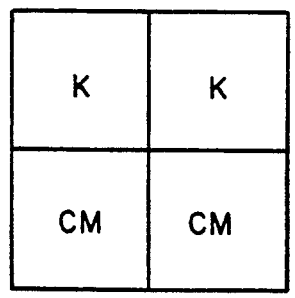
FIGS. 8A and 8B illustrate a dot-next-to-dot (DND) pixel assignment process for multiple color planes using the ordered dither pixel assignment process according to the present invention.

Assume that an individual super pixel has the following values: $K_{sum}=700$; $C_{sum}=700$, $M_{sum}=700$; $Y_{sum}=0$. For 256 levels of gray scale, or $2^8=256$ as a normalizing factor then $K_Q$, $C_Q$, $M_Q$ are all each equal to 2 and $K_R$, $C_R$, and $M_R$ are all each equal 188. And, $Y_Q$, $Y_R$ both equal 0 in this example. Assuming there is no $V_{max}$ limit imposed on this example, then the printed output matrix might, for example, be arranged as indicated in FIG. 8A with two black dots printed in both of the two upper quadrants of the super pixel in FIG. 8A, and a cyan and a magenta dot printed in both of the two lower quadrants of the super pixel in FIG. 8A.

Figure 8B:
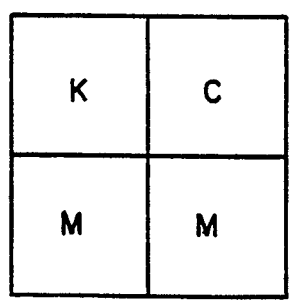

Assume now in our example that we have imposed a $V_{max}$ equal to four, such as for example to minimize paper cockleing by excessive ink volumes in the field of ink jet printing. Thus, since the sum of $K_Q$ plus $C_Q$ plus $M_Q$ in our above example equals 6, this means that this total of six dots for our 2 by 2 super pixel must be reduced to four. This may be done for example by reducing $K_Q$ and $C_Q$ to one dot each, thereby increasing the $K_R$ remainder to 188 plus 256 or 444 and the $C_R$ remainder to 188 plus 256, also 444. After this increased remainder is distributed to surrounding super pixels through the process of error diffusion as described above, the printed pixel sequence might be as indicated in FIG. 8B wherein one black dot and one cyan dot are now printed in the two upper quadrants of the 2 by 2 super pixel, and again the two magenta dots are printed in the lower two quadrants or pixels of the super pixels, thereby maintaining a $V_{max}$ limit of four dots as indicated above.

FIGS. 9A and 9B illustrate the pixel assignment process in accordance with the present invention where all of the quotient information is printed in FIG. 9B in the pixel assignment priority sequence in FIG. 9A, resulting in no loss of color quotient information. FIG. 9A gives a 1-9 printing sequence of the nine pixels which form the super pixels, and the inside-to-outside clockwise rotation of these numbers is known in this art and technology as "cluster" pixel assignment or geometry. Another available outside-to-inside pixel assignment which might be used, but not shown in the drawings, is also known as the "cluster" type of pixel assignment of dots to be printed within a super pixel. Yet another available pixel arrangement having two consecutive sequences of pixels to be spread at a maximum possible distance within a super pixel is known in the art as a "disperse" type of pixel arrangement. Thus, for K, C, M, and Y dot count of $1+3+2+0=6$ as indicated in these two figures, the K dot is printed in the center of "1" cluster pixel assignment position, the three cyan dots are next printed in sequence in the "2", "3", and "4" positions, and the two magenta dots are then printed in sequence in the "5" and "6" positions. Therefore, not only is all of the color quotient information preserved and not lost as in prior art ordered dither schemes, but the above cluster printing sequence of dot-next-to-dot printing tends to optimize the overall print quality of the output hardcopy converted image.

This dot-next-to-dot (DND) printing is also compatable with the use of void quadrants such as the lower left hand quadrant identified in FIG. 10A and 10B, and these techniques of leaving one or more pixels void are useful in certain types of ink jet printing applications where it is desired to minimize or eliminate color bleed during certain types of color printing applications.

Various modifications may be made in the above described embodiments without departing from the spirit and scope of this invention. For example, whereas the word "drops" or "dots" have been used frequently in the context of inkjet printing or the like, it should be understood that the present invention is broadly applicable to other types of printing processes such as electrophotographic or laser jet printing. Therefore, the word "drops" or "dots" are understood to be used interchangeably with the various other pixel selection in printing processes of other printing methods such as electrophotographic printing.

Also, other terms such as "$V_{max}$" indicating a volume maximum in ink jet printing should also be understood to refer to an upper dot count limit when used in the context of other types of printing such as electrophotographic printing.

I claim:

1. A method of converting scanned image information to a printed media output which includes the steps of:
   a. scanning an image to generate input image data,
   b. converting said input image data to ordered dither quotient data, and
   c. assigning all of said ordered dither quotient data in a predetermined priority and weight to a predefined number and position sequence of different pixels which together define a series of printed output super pixels or matrixes defining a given area of said printed media.

2. The method defined in claim 1 wherein said ordered dither quotient data is obtained for each of a plurality of separate color planes.

3. A method of converting scanned image information to a printed media output which comprises the steps of:
   a. scanning an image to generate input image data,
   b. converting said image input data to ordered dither quotient data and error diffusion remainder data,
   c. recombining said error diffusion remainder data with said input image data, and
   d. assigning said ordered dither quotient data in a predetermined printing sequence to each of a plurality of super pixels.

4. The method defined in claim 3 wherein the data processed in each of steps (a), (b), (c), and (d) is done in each of a plurality of separate color planes.

5. The method defined in claim 2 wherein error remainder data which is related to said ordered dither quotient data and is diffused into super pixels adjacent to a just printed super pixel and all ordered dither quotient information is retained and printed in said matrixes and is not lost as a result of thresholding.

6. The method defined in claim 5 where said ordered dither quotient data and said error diffusion remainder data is generated for each of a plurality of different color planes such as the cyan, yellow, magenta, and black color planes.

7. The method defined in claim 2 wherein said ordered dither quotient data and said error diffusion remainder data is generated in each color plane and said error diffusion remainder data is recombined with said input image data in each color plane, and said ordered dither quotient data is processed in each color plane to said plurality of super pixels.

8. A method for converting scanned color image information to printed media hardcopy output which comprises the steps of:
   a. scanning a color image to generate information containing cyan (C), magenta (M), yellow (Y), and black (K) super pixel data,
   b. adding said data in step a. above in separate color planes to obtain super pixel summed data $C_{sum}$, $M_{sum}$, $Y_{sum}$, and $K_{sum}$ for super pixel information in each color plane,
   c. dividing the summed information in step b. above by a chosen normalizing factor to obtain a quotient (Q) signal and a remainder (R) signal in each color plane, $C_Q$, $C_R$; $M_Q$, $M_R$; $Y_Q$, $Y_R$; and $K_Q$, and $K_R$, d. distributing said error remainder signals in step c. above in each color plane in an error diffusion process to selected super pixels in each color plane, and e. distributing said quotient signals in each color plane in an ordered dither process to an ordered dither matrix from which a printed color image may be derived.

9. The method defined in claim 8 wherein said quotient signals are assigned in a predetermined priority printing sequence to an output matrix in such a manner as to optimize the printed colors per unit area and thereby maximize the print quality of a hardcopy color image reproduction.

10. An ordered dither process for image reproduction which includes:
a. generation ordered dither quotient data representative of a scanned image, and
b. assigning all of said quotient data in a predetermined priority sequence to individual pixels within a super pixel.

11. The process defined in claim 10 which further includes diffusing error remainder information related to said quotient data to a plurality of other super pixels adjacent to said super pixel.

12. The process defined in claim 10 wherein each step therein is done in each of a plurality of color planes and in a dot-next-to-dot print assignment sequence to said individual pixels within said super pixel.

13. The process defined in claim 11 each step therein is done in each of a plurality of color planes and in a dot-next-to-dot print assignment sequence to said individual pixels within said super pixel.

14. A system for converting scanned image information to a printed media output which comprises:
a. means for scanning an image to generate input image data,
b. means connected to said scanning means for converting said input image data to ordered dither quotient data, and
c. means connected to said converting means for assigning said ordered dither quotient data in a predetermined sequence and weight to a predefined number and position sequence of different pixels which together define a series of printed output super pixels or matrixes defining a given area of said printed media.

15. The system defined in claim 14 wherein said ordered dither quotient data is obtained for each of a plurality of separate color planes.

16. A system of converting scanned image information to a printed media output which comprises the steps of:
a. means for scanning an image to generate input image data,
b. means connected to said scanning means for converting said image input data to ordered dither quotient data and error diffusion remainder data,
c. means connected to said converting means for recombining said error diffusion remainder data with said input image data, and
d. means connected to said converting means for assigning said ordered dither quotient data in a predetermined printing sequence to a plurality of super pixels.

17. The system defined in claim 16 wherein the data processed in each of steps (a), (b), (c), and (d) is done in each of a plurality of separate color planes.

18. The system defined in claim 15 wherein error remainder data which is related to said ordered dither quotient data and said system includes means for diffusing said error remainder data into super pixels adjacent to a just printed super pixel and all ordered dither quotient information is retained and printed in said matrixes and is not lost as a result of thresholding.

19. The system defined in claim 18 which includes means for generating said quotient and remainder data for each of a plurality of different color planes such as the cyan, yellow, magenta, and black color planes.

20. The system defined in claim 15 which includes means for generating said ordered dither quotient data and said error diffusion remainder data in each color plane, and means for recombining said error diffusion remainder data with said input image data in each color plane, and means for processing said ordered dither quotient data in each color plane to said plurality of super pixels.

21. A system for converting scanned color image information to printed media hardcopy output which comprises:
a. means for scanning a color image to generate information containing cyan (C), magenta (M), yellow (Y), and black (K) super pixel data,
b. means connected to said scanning means for adding said data in step a. above in separate color planes to obtain super pixel summed data $C_{sum}$, $M_{sum}$, $Y_{sum}$, and $K_{sum}$ for super pixel information in each color plane,
c. means connected to said adding means for dividing the summed information in step b. above by a chosen normalizing factor to obtain a quotient (Q) signal and a remainder (R) signal in each color plane, $C_Q$, $C_R$; $M_Q$, $M_R$; $Y_Q$, $Y_R$; and $K_Q$, and $K_R$,
d. means connected to said dividing means for distributing said remainder signals in step c. above in each color plane in an error diffusion process to recombine said remainder signals in each color plane with the information summed in step b. above, and
e. means connected to said dividing means for distributing said quotient signals in each color plane in an ordered dither process to an ordered dither matrix from which a printed color image may be derived.

22. The system defined in claim 21 which further includes means connected to said quotient signal distributing means for assigning said quotient signals in a predetermined priority printing sequence to an output matrix in such a manner as to optimize the printed colors per unit area and thereby maximize the print quality of a hardcopy color image reproduction 23. An ordered dither system which includes:
a. means for generating ordered dither quotient data representative of a scanned image, and
b. means connected to said generating means for assigning all of said quotient data in a predetermined priority sequence to individual pixels within a super pixel.

24. The system defined in claim 23 which further includes means connected to said generating means for diffusing error remainder information related to said quotient data to a plurality of other super pixels adjacent to said super pixel.

25. The system defined in claim 24 which includes means in each of a plurality of color planes for generating said ordered dither quotient data and said error remainder information.

* * * * *